(12) United States Patent
Lacy et al.

(10) Patent No.: US 11,041,389 B2
(45) Date of Patent: Jun. 22, 2021

(54) ADAPTIVE COVER FOR COOLING PATHWAY BY ADDITIVE MANUFACTURE

(71) Applicant: General Electric Company, Schenectady, NY (US)

(72) Inventors: Benjamin Paul Lacy, Greer, SC (US); Victor John Morgan, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 746 days.

(21) Appl. No.: 15/609,576

(22) Filed: May 31, 2017

(65) Prior Publication Data

US 2018/0347371 A1 Dec. 6, 2018

(51) Int. Cl.
| | |
|---|---|
| *F01D 5/18* | (2006.01) |
| *F01D 9/06* | (2006.01) |
| *F01D 5/14* | (2006.01) |
| *F01D 9/04* | (2006.01) |
| *F01D 25/12* | (2006.01) |

(52) U.S. Cl.
CPC ............ *F01D 5/186* (2013.01); *F01D 5/147* (2013.01); *F01D 9/041* (2013.01); *F01D 9/065* (2013.01); *F01D 5/187* (2013.01); *F01D 25/12* (2013.01); *F05D 2230/30* (2013.01); *F05D 2230/31* (2013.01); *F05D 2240/11* (2013.01); *F05D 2240/81* (2013.01); *F05D 2260/202* (2013.01); *F05D 2270/3032* (2013.01)

(58) Field of Classification Search
CPC .......... F01D 5/186; F01D 5/187; F01D 5/189; F01D 5/18; F01D 5/183

USPC ........................................................ 416/96 R
See application file for complete search history.

(56) References Cited

U.S. PATENT DOCUMENTS

| | | |
|---|---|---|
| 3,626,568 A | 12/1971 | Silverstein et al. |
| 5,269,653 A | 12/1993 | Evans |
| | (Continued) | |

FOREIGN PATENT DOCUMENTS

| | | |
|---|---|---|
| EP | 1375825 A1 | 1/2004 |
| EP | 1655454 A1 | 5/2006 |
| | (Continued) | |

OTHER PUBLICATIONS

"Resbond 907GF" 2350 Degrees Adhesive & Sealant Cotronics Corporation, n.d, 1 page (Continued)

*Primary Examiner* — Woody A Lee, Jr.
*Assistant Examiner* — Behnoush Haghighian
(74) *Attorney, Agent, or Firm* — Charlotte Wilson; Hoffman Warnick LLC

(57) ABSTRACT

A hot gas path component of an industrial machine includes an adaptive cover for a cooling pathway. The component and adaptive cover are made by additive manufacturing. The component includes an outer surface exposed to a working fluid having a high temperature; an internal cooling circuit; and a cooling pathway in communication with the internal cooling circuit and extending towards the outer surface. The adaptive cover is positioned in the cooling pathway at the outer surface. The adaptive cover may include a heat transfer enhancing surface at the outer surface causing the adaptive cover to absorb heat faster than the outer surface.

16 Claims, 9 Drawing Sheets

(56) References Cited

U.S. PATENT DOCUMENTS

| | | | |
|---|---|---|---|
| 5,726,348 | A | 3/1998 | Draghi et al. |
| 6,265,022 | B1 | 7/2001 | Fernihough et al. |
| 6,402,464 | B1 | 6/2002 | Chiu et al. |
| 6,454,156 | B1 | 9/2002 | Taras, Jr. et al. |
| 6,478,537 | B2 | 11/2002 | Junkin |
| 6,492,038 | B1 | 12/2002 | Rigney et al. |
| 7,186,091 | B2 | 3/2007 | Lee et al. |
| 7,241,107 | B2 | 7/2007 | Spanks, Jr. et al. |
| 7,772,314 | B2 | 8/2010 | Fernihough et al. |
| 7,909,581 | B2 | 3/2011 | Klein |
| 7,950,902 | B2 | 5/2011 | Camhi et al. |
| 8,052,378 | B2 | 11/2011 | Draper |
| 8,574,671 | B2 | 11/2013 | Ahmad et al. |
| 9,617,859 | B2 | 4/2017 | Morgan et al. |
| 9,797,260 | B2 | 10/2017 | Philbrick et al. |
| 2004/0226682 | A1 | 11/2004 | Ehrhard et al. |
| 2006/0263217 | A1 | 11/2006 | Spanks, Jr. et al. |
| 2007/0036942 | A1* | 2/2007 | Steele .................... F01D 25/12 |
| | | | 428/131 |
| 2007/0253815 | A1 | 11/2007 | Kopmels et al. |
| 2008/0145674 | A1 | 6/2008 | Darolia et al. |
| 2009/0074576 | A1 | 3/2009 | Brostmeyer |
| 2009/0232661 | A1 | 9/2009 | Ryznic |
| 2010/0239409 | A1 | 9/2010 | Draper |
| 2011/0011563 | A1 | 1/2011 | Steele |
| 2011/0070095 | A1 | 3/2011 | Harron |
| 2011/0097188 | A1 | 4/2011 | Bunker |
| 2011/0189015 | A1* | 8/2011 | Shepherd ................ F01D 5/186 |
| | | | 416/95 |
| 2011/0241297 | A1 | 10/2011 | Morgan et al. |
| 2012/0183412 | A1 | 7/2012 | Lacy et al. |
| 2012/0189435 | A1 | 7/2012 | Morgan et al. |
| 2013/0052036 | A1 | 2/2013 | Smith |
| 2013/0078110 | A1 | 3/2013 | Boyer |
| 2013/0104517 | A1 | 5/2013 | Correia et al. |
| 2013/0230394 | A1 | 9/2013 | Ellis et al. |
| 2014/0099183 | A1 | 4/2014 | Morgan et al. |
| 2014/0120274 | A1* | 5/2014 | Bunker ................ C23C 14/5886 |
| | | | 428/34.1 |
| 2015/0198062 | A1* | 7/2015 | Morgan .................. F01D 5/186 |
| | | | 415/1 |
| 2016/0146019 | A1 | 5/2016 | Pizano et al. |
| 2016/0229019 | A1* | 8/2016 | Shuck ...................... B23H 9/14 |
| 2016/0369636 | A1* | 12/2016 | Hitchman ............. F01D 11/122 |
| 2018/0347370 | A1 | 12/2018 | Lacy et al. |

FOREIGN PATENT DOCUMENTS

| | | |
|---|---|---|
| EP | 2230384 A2 | 9/2010 |
| EP | 2354453 A1 | 8/2011 |
| EP | 2716867 A1 | 4/2014 |
| EP | 2 873 806 A1 | 5/2015 |
| EP | 2937512 A1 | 10/2015 |

OTHER PUBLICATIONS

"High Temperature Ceramic-metallic Pastes", Aremco Products, Inc., Technical Bulletin A3, Jun. 2012, 2 pages.

U.S. Appl. No. 15/609,562, Non-Final Office Action dated Nov. 22, 2019, 30 pgs.

Extended European Search Report and Opinion issued in connection with corresponding EP Application No. 18164244 dated Aug. 16, 2018, 8 pages.

Extended European Search Report and Opinion issued in connection with corresponding EP Application No. 18163779.4 dated Oct. 4, 2018.

U.S. Appl. No. 15/609,562, Final Office Action dated Apr. 16, 2020, 24 pgs.

U.S. Appl. No. 15/609,562, Notice of Allowance dated Oct. 7, 2020, 16 pages.

* cited by examiner

ADAPTIVE COVER FOR COOLING PATHWAY BY ADDITIVE MANUFACTURE

GOVERNMENT CONTRACT

This invention was made with government support under contract number DE-FE0023965 awarded by the US Department of Energy. The government has certain rights in the invention.

CROSS-REFERENCE TO RELATED APPLICATIONS

This application is related to U.S. application Ser. No. 15/609,562, filed concurrently and currently pending.

BACKGROUND OF THE INVENTION

The disclosure relates generally to cooling of components, and more particularly, to an adaptive cover for a cooling pathway of a hot gas path component. The adaptive cover is made by additive manufacturing.

Hot gas path components that are exposed to a working fluid at high temperatures are used widely in industrial machines. For example, a gas turbine system includes a turbine with a number of stages with blades extending outwardly from a supporting rotor disk. Each blade includes an airfoil over which the hot combustion gases flow. The airfoil must be cooled to withstand the high temperatures produced by the combustion gases. Insufficient cooling may result in undo stress and oxidation on the airfoil and may lead to fatigue and/or damage. The airfoil thus is generally hollow with one or more internal cooling flow circuits leading to a number of cooling holes and the like. Cooling air is discharged through the cooling holes to provide film cooling to the outer surface of the airfoil. Other types of hot gas path components and other types of turbine components may be cooled in a similar fashion.

Although many models and simulations may be performed before a given component is put into operation in the field, the exact temperatures to which a component or any area thereof may reach vary greatly due to component specific hot and cold locations. Specifically, the component may have temperature dependent properties that may be adversely affected by overheating. As a result, many hot gas path components may be overcooled to compensate for localized hot spots that may develop on the components. Such excessive overcooling, however, may have a negative impact on overall industrial machine output and efficiency.

BRIEF DESCRIPTION OF THE INVENTION

A first aspect of the disclosure provides a component for use in a hot gas path of an industrial machine, the component comprising: an outer surface exposed to a working fluid having a high temperature; an internal cooling circuit; a cooling pathway in communication with the internal cooling circuit and extending towards the outer surface; an adaptive cover in the cooling pathway at the outer surface, the adaptive cover configured to, in response to the high temperature reaching or exceeding a predetermined temperature of the adaptive cover, open the cooling pathway, wherein the component is additively manufactured such that the adaptive cover is integrally formed with the outer surface and the cooling pathway.

A second aspect of the disclosure provides a component for use in a hot gas path of an industrial machine, the component comprising: an outer surface exposed to a working fluid having a high temperature; a thermal barrier coating over the outer surface; an internal cooling circuit; a cooling pathway in communication with the internal cooling circuit and extending towards the outer surface; and an adaptive cover in the cooling pathway at the outer surface, the adaptive cover including a heat transfer enhancing surface at the outer surface causing the adaptive cover to absorb heat faster than the outer surface.

A third aspect of the disclosure provides a non-transitory computer readable storage medium storing code representative of a hot gas path (HGP) component, the HGP component physically generated upon execution of the code by a computerized additive manufacturing system, the code comprising: code representing the HGP component, the HGP component including: an outer surface, an internal cooling circuit, a cooling pathway in communication with the internal cooling circuit and extending towards the outer surface, and an adaptive cover in the cooling pathway at the outer surface, the adaptive cover including a heat transfer enhancing surface at the outer surface causing the adaptive cover to absorb heat faster than the outer surface.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As an initial matter, in order to clearly describe the current disclosure it will become necessary to select certain terminology when referring to and describing relevant machine components within an industrial machine such as a gas turbine system. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. The term "radial" refers to movement or position perpendicular to an axis. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. It will be appreciated that such terms may be applied in relation to the center axis of the turbine.

As indicated above, the disclosure provides a hot gas path (HGP) component including an adaptive cover for a cooling pathway. The HGP component and the adaptive cover are formed by additive manufacturing and may include a heat transfer enhancing surface on the adaptive cover to increase heat transfer thereto when exposed to a high temperature sufficient to remove the adaptive cover. The use of the heat transfer enhancing surface creates a cooling pathway that will quickly open upon a temperature exceeding a predetermined temperature of the adaptive cover. The additive manufacturing process allows for formation of not only the adaptive cover with the heat transfer enhancing surface but other intentional weakness regions that allow the cooling pathway to open.

Figure 1:
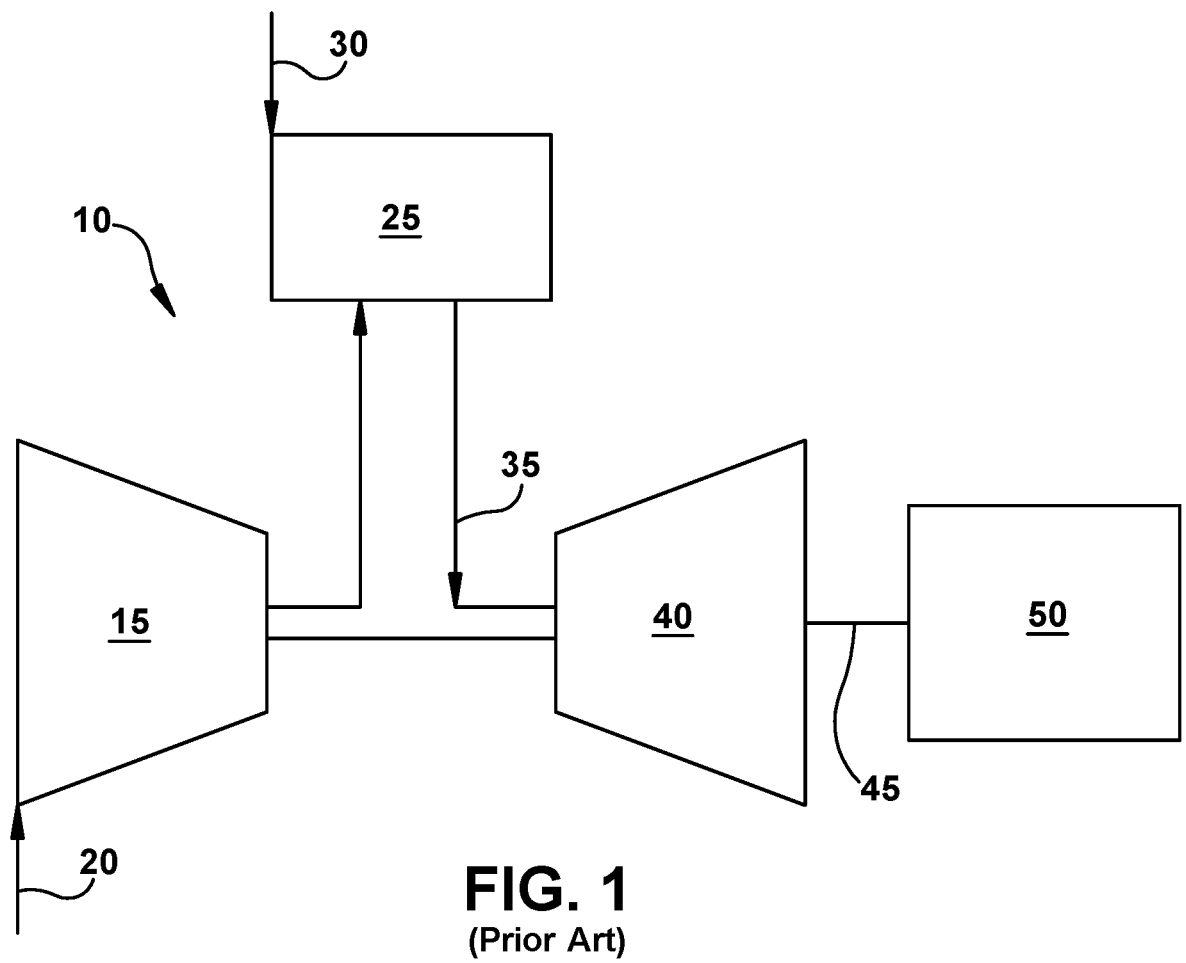
FIG. 1 is a schematic diagram of an illustrative industrial machine having a hot gas path component in the form of a gas turbine system.

Referring now to the drawings, in which like numerals refer to like elements throughout the several views, FIG. 1 shows a schematic view of an illustrative industrial machine in the form of a gas turbine system 10. While the disclosure will be described relative to gas turbine system 10, it is emphasized that the teachings of the disclosure are applicable to any industrial machine having a hot gas path component requiring cooling. Gas turbine system 10 may include a compressor 15. Compressor 15 compresses an incoming flow of air 20, and delivers the compressed flow of air 20 to a combustor 25. Combustor 25 mixes the compressed flow of air 20 with a pressurized flow of fuel 30 and ignites the mixture to create a flow of combustion gases 35. Although only a single combustor 25 is shown, gas turbine system 10 may include any number of combustors 25. Flow of combustion gases 35 is in turn delivered to a turbine 40. Flow of combustion gases 35 drives turbine 40 so as to produce mechanical work. The mechanical work produced in turbine 40 drives compressor 15 via a shaft 45 and an external load 50 such as an electrical generator and the like.

Gas turbine system 10 may use natural gas, liquid fuels, various types of syngas, and/or other types of fuels and blends thereof. Gas turbine system 10 may be any one of a number of different gas turbine engines offered by General Electric Company of Schenectady, N.Y. and the like. Gas turbine system 10 may have different configurations and may use other types of components. Teachings of the disclosure may be applicable to other types of gas turbine systems and or industrial machines using a hot gas path. Multiple gas turbine systems, or types of turbines, and or types of power generation equipment also may be used herein together.

Figure 2:
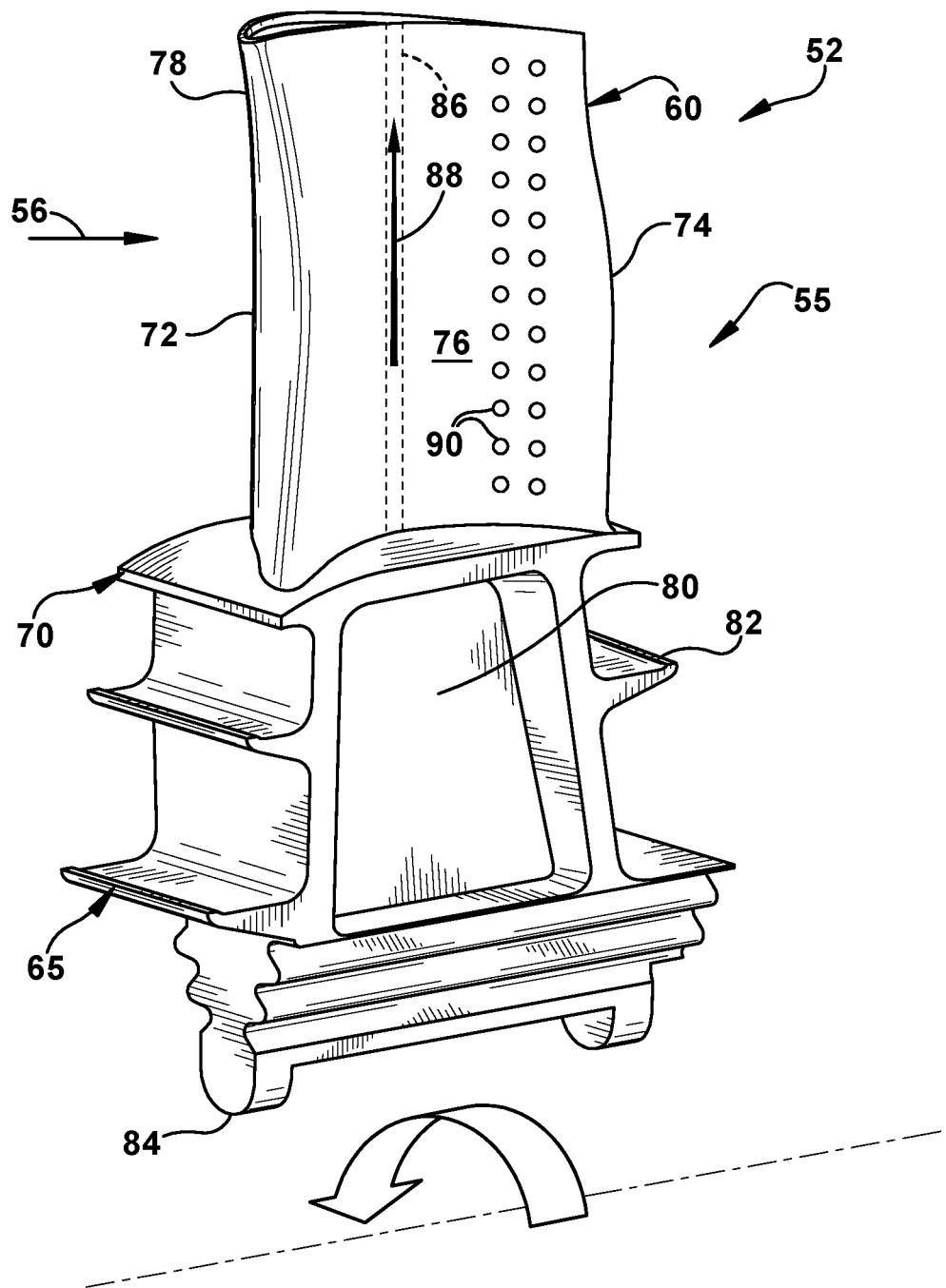
FIG. 2 is a perspective view of a known hot gas path component in the form of a turbine blade.

FIG. 2 shows an example of a hot gas path (HGP) component 52 in the form of a turbine blade 55 that may be used in a hot gas path (HGP) 56 of turbine 40 and the like. While the disclosure will be described relative to HGP component 52 in the form of turbine blade 55 and more specifically an airfoil 60 thereof, it is emphasized that the teachings of the disclosure are applicable to any HGP component requiring cooling. Generally described, turbine blade 55 may include airfoil 60, a shank portion 65, and a platform 70 disposed between airfoil 60 and shank portion 65. Airfoil 60 generally extends radially upward from platform 70 and includes a leading edge 72 and a trailing edge 74. Airfoil 60 also may include a concave surface defining a pressure side 76 and an opposite convex surface defining a suction side 78. Platform 70 may be substantially horizontal and planar. Shank portion 65 may extend radially downward from platform 70 such that platform 70 generally defines an interface between airfoil 60 and shank portion 65. Shank portion 65 may include a shank cavity 80. Shank portion 65 also may include one or more angel wings 82 and a root structure 84 such as a dovetail and the like. Root structure 84 may be configured to secure, with other structure, turbine blade 55 to shaft 45 (FIG. 1). Any number of turbine blades 55 may be circumferentially arranged about shaft 45. Other components and or configurations also may be used herein.

Turbine blade 55 may include one or more cooling circuits 86 extending therethrough for flowing a cooling medium 88 such as air from compressor 15 (FIG. 1) or from another source. Steam and other types of cooling mediums 88 also may be used herein. Cooling circuits 86 and cooling medium 88 may circulate at least through portions of airfoil 60, shank portion 65, and platform 70 in any order, direction, or route. Many different types of cooling circuits and cooling mediums may be used herein in any orientation. Cooling circuits 86 may lead to a number of cooling holes 90 or other types of cooling pathways for film cooling about airfoil 60 or elsewhere. Other types of cooling methods may be used. Other components and or configurations also may be used herein.

Figure 3:
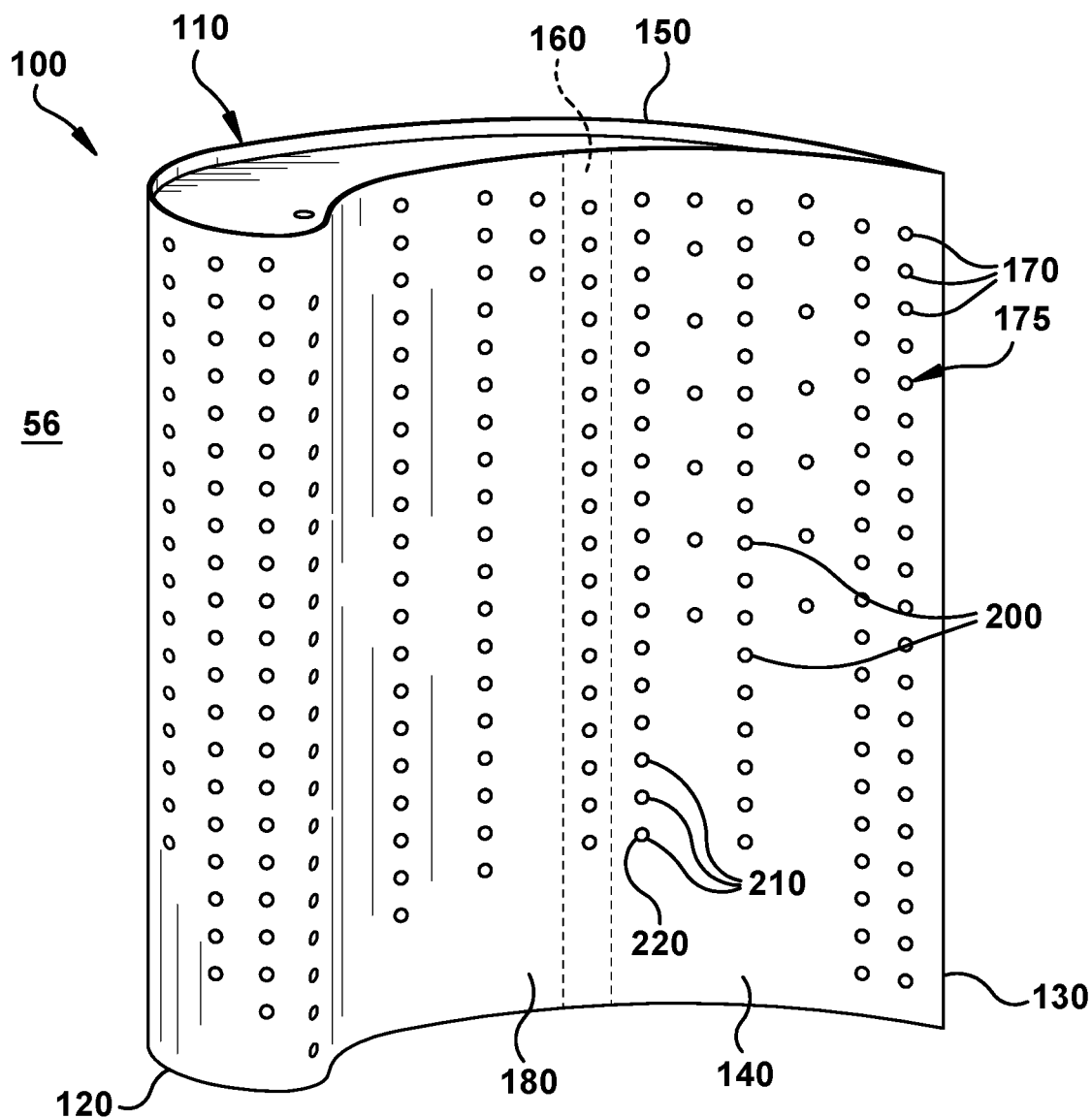
FIG. 3 is a perspective view of a portion of a hot gas path component according to embodiments of the disclosure.
Figure 4:
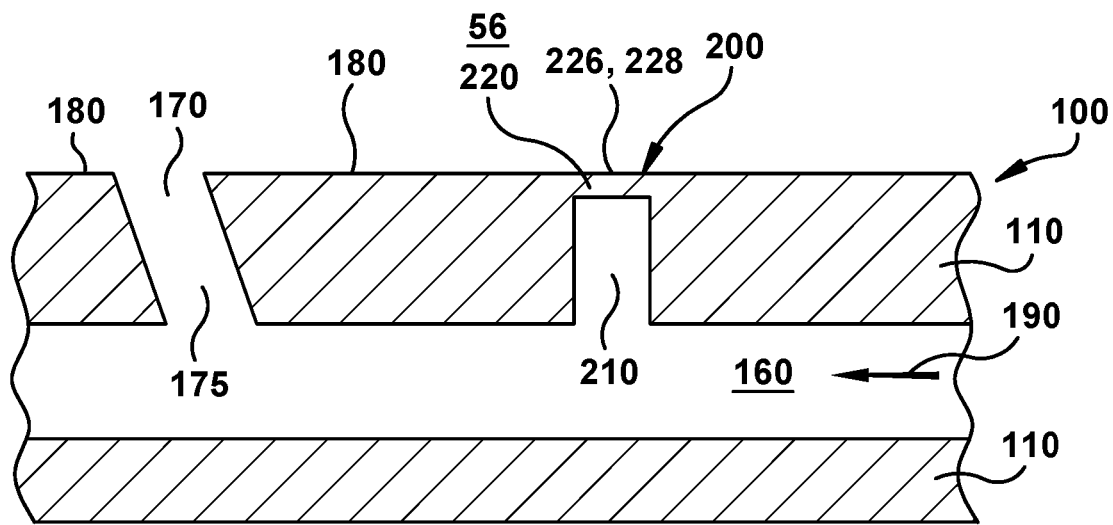
FIG. 4 is a cross-sectional view of a portion of the HGP component of FIG. 3 including an adaptive cover according to embodiments of the disclosure.

FIGS. 3-4 show an example of a portion of an HGP component 100 as may be described herein. FIG. 3 is a perspective view of HGP component 100, and FIG. 4 is a cross-sectional view of a portion of HGP component. In this example, HGP component 100 may be an airfoil 110 and more particularly a sidewall thereof. HGP component 100 may be a part of a blade or a vane and the like. HGP component 100 also may be any type of air-cooled component including a shank, a platform, or any type of hot gas path component. As noted, other types of HGP components and other configurations may be used herein. Similar to that described above, airfoil 110 may include a leading edge 120 and a trailing edge 130. Likewise, airfoil 110 may include a pressure side 140 and a suction side 150. Airfoil 110 also may include one or more internal cooling circuits 160 (FIGS. 3 and 4) therein. As shown in FIG. 4, internal cooling circuits 160 may lead to a number of cooling pathways 170 such as a number of cooling holes 175. Cooling holes 175 may extend through an outer surface 180 of airfoil 110 or elsewhere. Outer surface 180 is exposed to a working fluid having a high temperature. As used herein, "high temperature" depends on the form of industrial machine, e.g., for gas turbine system 10, high temperature may be any temperature greater than 100° C. Internal cooling circuits 160 and cooling holes 175 serve to cool airfoil 110 and components thereof with a cooling medium 190 (FIG. 4) therein. Any type of cooling medium 190, such as air, steam, and the like, may be used herein from any source. Cooling holes 175 may have any size, shape, or configuration. Any number of cooling holes 175 may be used herein. Cooling holes 175 may extend to outer surface 180 in an orthogonal or non-orthogonal manner. Other types of cooling pathways 170 may be used herein. Other components and or configurations may be used herein.

As shown in FIGS. 3 and 4, HGP component 100, e.g., airfoil 110, also may include a number of other cooling pathways 200 according to embodiments of the disclosure. Cooling pathways 200 may include any cooling pathway in communication with internal cooling circuit 160 and extending towards outer surface 180 and employing an adaptive cover 220 according to embodiments of the disclosure. Adaptive cover 220 closes cooling pathway 200 until it is removed. Thus, cooling pathways 200 are distinguishable from cooling pathways 170 and cooling holes 175 that are permanently open to outer surface 180.

As shown in FIGS. 4-10, cooling pathways 200 may be in the form of a number of adaptive cooling holes 210. Internal cooling circuits 160 are fluidly coupled to adaptive cooling holes 210 and serve to cool airfoil 110 and components thereof with a cooling medium 190 therein, when open. As noted, any type of cooling medium 190, such as air, steam, and the like, may be used herein from any source. Adaptive cooling holes 210 may have any size, shape (e.g., circular, round, polygonal, etc.), or configuration. Any number of adaptive cooling holes 210 may be used herein. As shown best in FIG. 4, adaptive cooling holes 210 may extend towards outer surface 180 in a manner similar to cooling holes 175, but are covered or closed by an adaptive cover 220 according to embodiments of the disclosure. Adaptive cooling holes 210 may extend toward outer surface 180 in an orthogonal (FIG. 4) or non-orthogonal (FIG. 6) manner relative to outer surface 180. Other types of cooling pathways 200 may be used herein. Other components and or configurations may be used herein.

Figure 5:
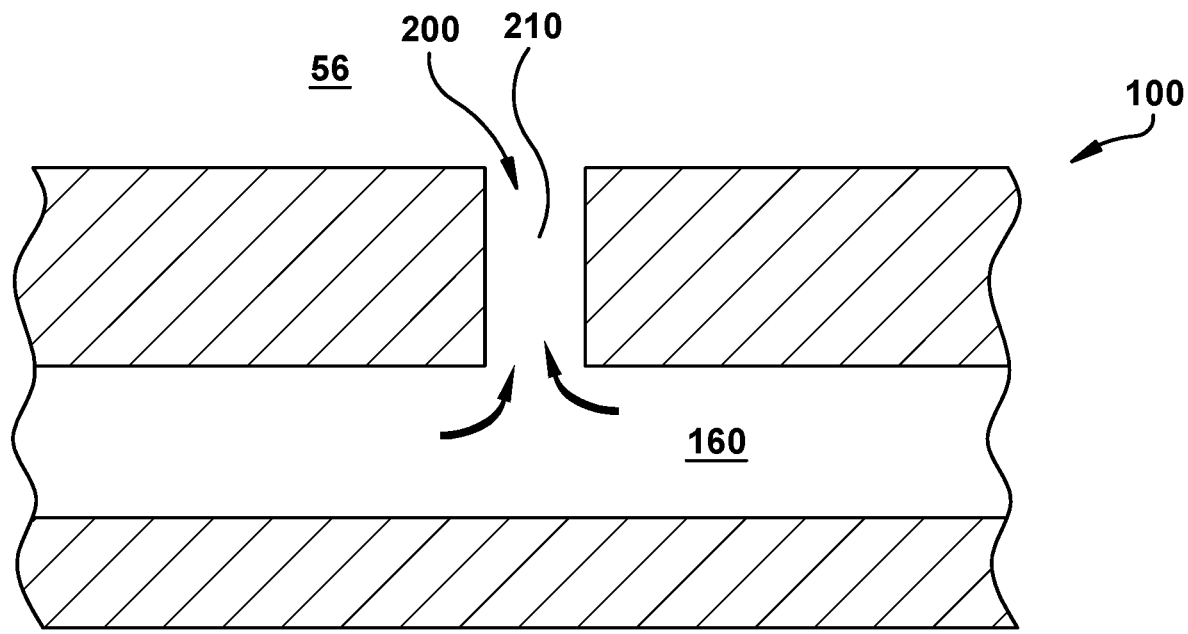
FIG. 5 is a cross-sectional view of a portion of the HGP component having a temperature to remove an adaptive cover according to embodiments of the disclosure.
Figure 6:
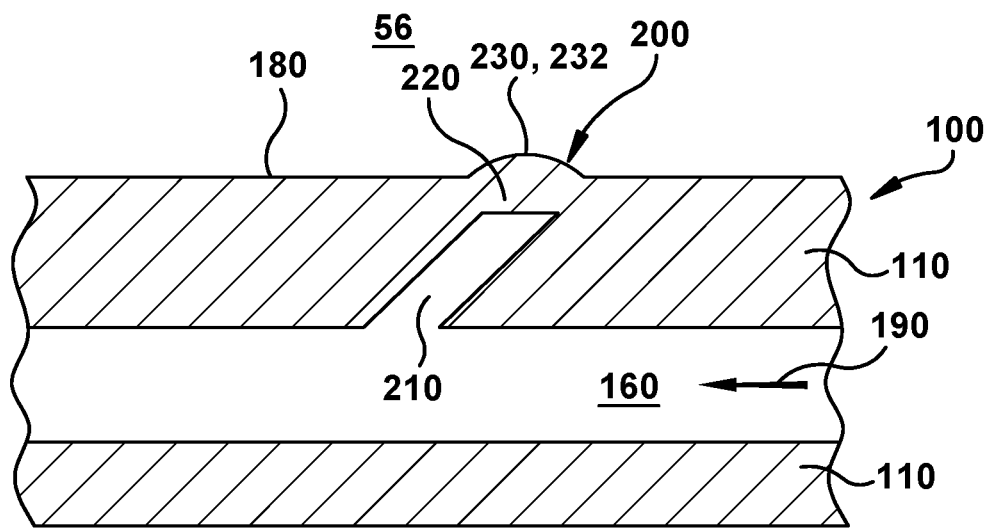
FIG. 6 is a cross-sectional view of a portion of the HGP component including an adaptive cover including a heat transfer enhancing surface according to embodiments of the disclosure.

As shown in FIG. 4, adaptive cover 220 is in cooling pathway 200 at outer surface 180. As used herein, "at outer surface 180" indicates adaptive cover 220 meets with outer surface 180 so as to close cooling pathway 200, e.g., cooling hole 210. As shown in FIG. 6, adaptive cover 220 is configured to, in response to the high temperature, e.g., of HGP 56, reaching or exceeding a predetermined temperature of adaptive cover 220, open cooling pathway 200. Adaptive cover 220 is made of the same material as the rest of HGP component 100, i.e., it is not a plug of other material like a polymer and includes a single material. Prior to removal, adaptive cover 220 is impervious to cooling medium 190. As used herein, the "predetermined temperature of adaptive cover" is a temperature at which adaptive cover 220 will change state in such a way as to allow its removal. In many cases, as shown in FIGS. 4 and 5, exposure of adaptive cover 220 to HGP 56 environment alone will provide the predetermined temperature sufficient for removal of adaptive cover 220 (e.g., through sublimation, ashing, oxidation or melting thereof), or cracking or popping off due to high temperatures. In FIG. 4, adaptive cover 220 includes a planar or flat surface 226 similar to outer surface 180 of HGP component 100.

Figure 7:
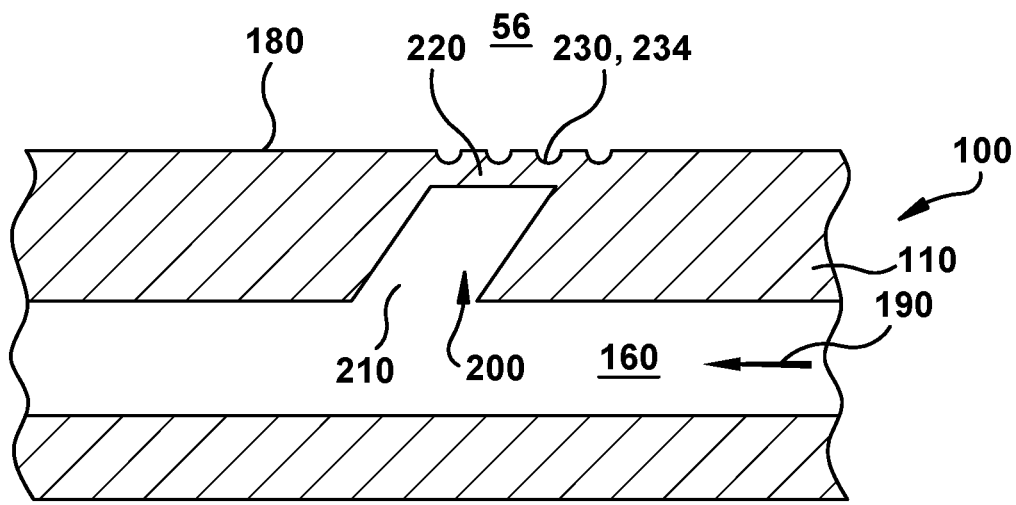
FIG. 7 is a cross-sectional view of a portion of the HGP component including an adaptive cover including a heat transfer enhancing surface according to other embodiments of the disclosure.
Figure 8:
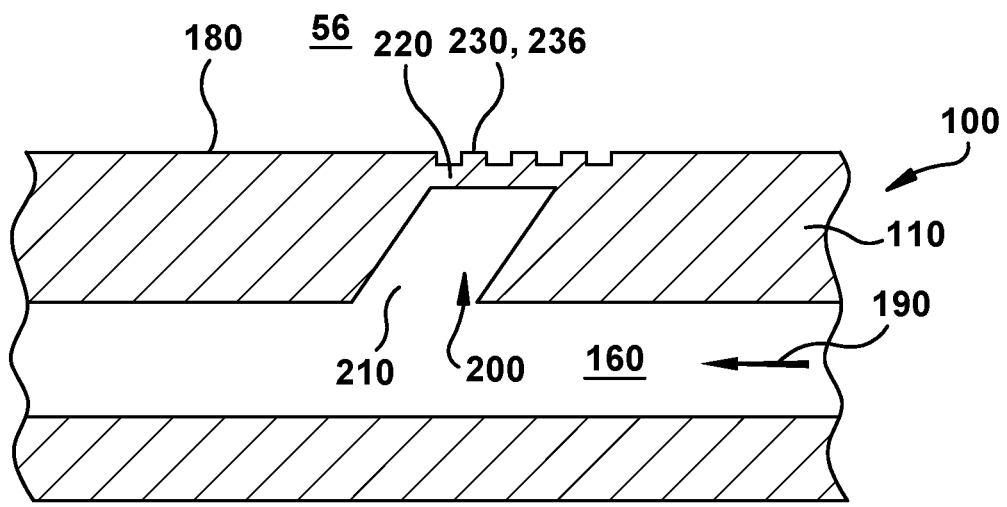
FIG. 8 is a cross-sectional view of a portion of the HGP component including an adaptive cover including a heat transfer enhancing surface according to other embodiments of the disclosure.

As shown in FIGS. 6-8, in some embodiments, adaptive cover 220 may include a heat transfer enhancing surface 230 at outer surface 180 causing adaptive cover 220 to absorb heat faster than outer surface 180. Heat transfer enhancing surface 230 is built into HGP component 100, i.e., it is original to HGP component 100 and does not come into existence through use. Heat transfer enhancing surface 230 may take any form that increases heat transfer from HGP 56 to adaptive cover 220. For example, heat transfer enhancing surface 230 may include any surface 228 (FIG. 5) that is less smooth than outer surface 180, i.e., with a higher surface roughness than outer surface 180. Surface 228 (FIG. 5) may be created in any fashion during additive manufacture, e.g., by using build parameters that create a rougher surface than outer surface 180. As shown in FIGS. 6-8, respectively, in other embodiments, heat transfer enhancing surface 230 may include a bulged surface 232, a dimpled surface 234 or a striped surface 236. Combinations of any of these embodiments may also be employed. Other heat transfer enhancing surfaces different than outer surface 180 may also be possible.

Figure 9:
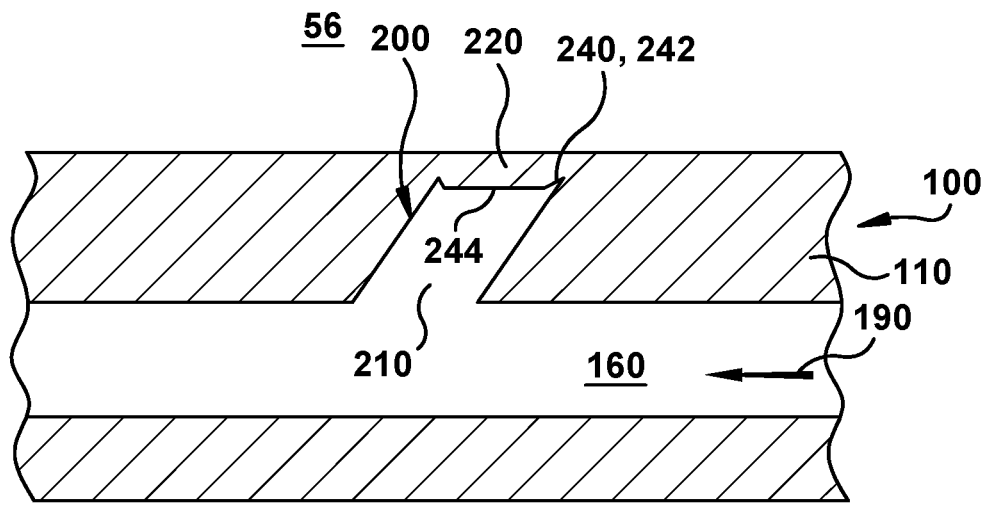
FIG. 9 is a cross-sectional view of a portion of the HGP component including an adaptive cover having weakened region according to embodiments of the disclosure.
Figure 10:
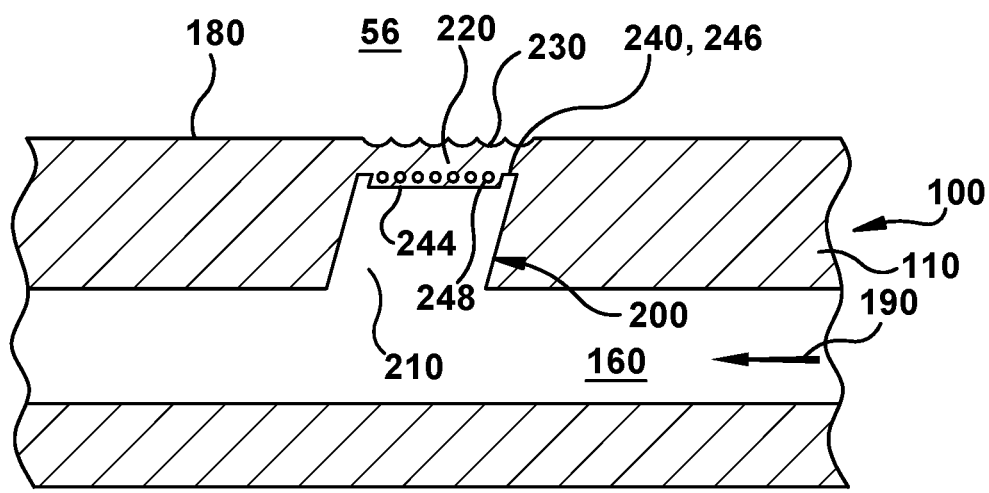
FIG. 10 is a cross-sectional view of a portion of the HGP component including an adaptive cover having weakened region and heat transfer enhancing surface according to other embodiments of the disclosure.

In another embodiment, shown in FIGS. 9 and 10, adaptive cover 220 may include a weakened region 240. Weakened region 240 may include any structural weakness that may foster removal of adaptive cover 220 from cooling pathway 200. That is, weakened region 240 may include intentional weaknesses built in so that upon the high temperature reaching or exceeding the predetermined temperature of adaptive cover 220, weakened region 240 of adaptive cover 220 will be the first thing to fail. These weaknesses could include: porosity on inner portion 244 in adaptive cover 220, and/or stress risers such as perforations, notches or grooves, etc. In FIG. 9, weakened region 240 may include a notch 242 on an inner portion 244 of adaptive cover 220. In another embodiment, shown in FIG. 10, weakened region 240 may include a groove 246 on inner portion 244 of adaptive cover 220. Each form of weakened region 240 may extend about a portion or an entirety of inner portion 244. Different forms of weakened regions 240 may be employed alone or in combination. While mostly shown in use separately, as shown in FIG. 10, any form of heat transfer enhancing surface 230 may be used with any form of weakened region 240.

Figure 11A:
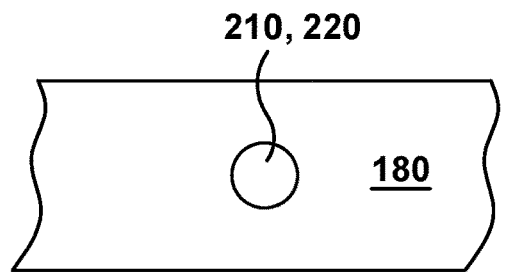
FIGS. 11A-D are top views of various forms of cooling pathways and adaptive covers according to embodiments of the disclosure.
Figure 11B:
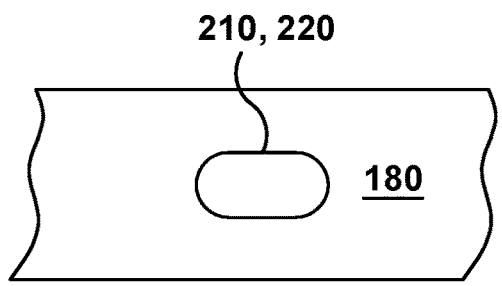
Figure 11C:
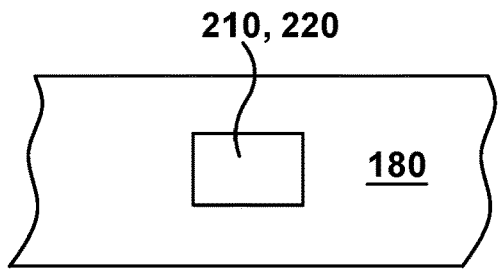
Figure 11D:
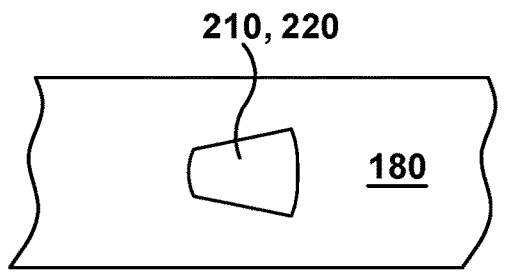

FIGS. 11A-C show various forms of adaptive cooling holes 210 or adaptive covers 220 in outer surface 180. As illustrated, each may have a round (circular FIG. 11A or oval FIG. 11B) or a non-round cross-section (square or rectangular, FIG. 11C) at outer surface 180. Any non-round cross-section may be employed, e.g., square, rectangular or other polygon. As shown in FIG. 11D, adaptive covers 220 may also have a cross-section to fit any variety of diffuser, and cooling holes leading thereto could have any cross-section. Cooling pathways 200 may also take different internal dimensions, shapes, etc.

Figure 12:
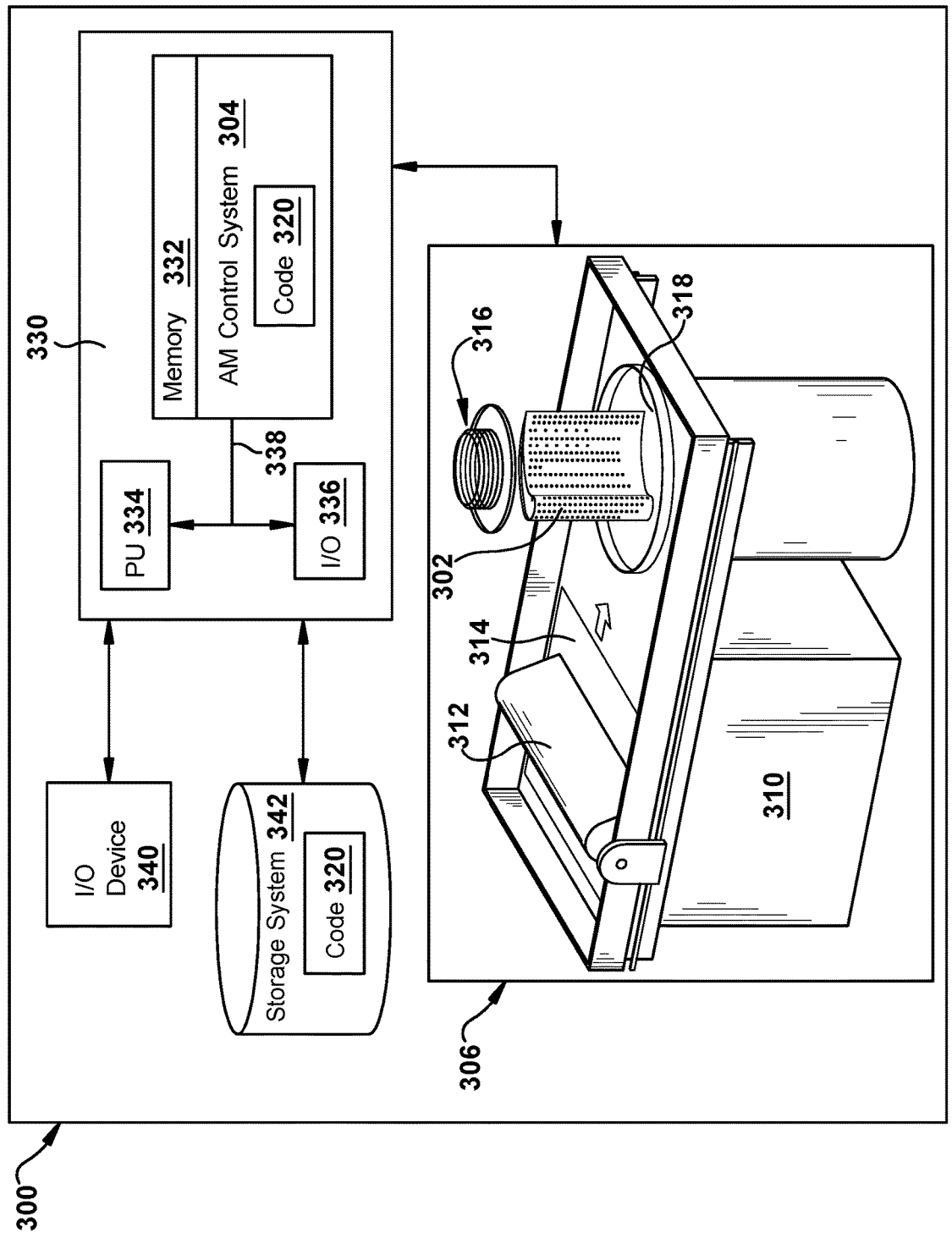
FIG. 12 is a block diagram of an additive manufacturing process including a non-transitory computer readable storage medium storing code representative of an HGP component according to embodiments of the disclosure.

Referring to FIG. 12, in accordance with embodiments of the disclosure, HGP component 100 and adaptive cover 220 may be additively manufactured such that adaptive cover 220 is integrally formed with outer surface 180 and cooling pathway 200. Additive manufacturing also allows for easy formation of much of the structure described herein, i.e., without very complex machining. As used herein, additive manufacturing (AM) may include any process of producing an object through the successive layering of material rather than the removal of material, which is the case with conventional processes. Additive manufacturing can create complex geometries without the use of any sort of tools, molds or fixtures, and with little or no waste material. Instead of machining components from solid billets of plastic or metal, much of which is cut away and discarded, the only material used in additive manufacturing is what is required to shape the part. Additive manufacturing processes may include but are not limited to: 3D printing, rapid prototyping (RP), direct digital manufacturing (DDM), binder jetting, selective laser melting (SLM) and direct metal laser melting (DMLM).

To illustrate an example of an additive manufacturing process, FIG. 12 shows a schematic/block view of an illustrative computerized additive manufacturing system 300 for generating an object 302, i.e., HGP component 100. In this example, system 300 is arranged for DMLM. It is understood that the general teachings of the disclosure are equally applicable to other forms of additive manufacturing. AM system 300 generally includes a computerized additive manufacturing (AM) control system 304 and an AM printer 306. AM system 300, as will be described, executes code 320 that includes a set of computer-executable instructions defining HGP component 100 (FIGS. 4-11C) including adaptive cover 220 to physically generate the component using AM printer 306. Each AM process may use different raw materials in the form of, for example, fine-grain powder, liquid (e.g., polymers), sheet, etc., a stock of which may be held in a chamber 310 of AM printer 306. In the instant case, HGP component 100 (FIGS. 4-11C) may be made of metal powder or similar materials. As illustrated, an applicator 312 may create a thin layer of raw material 314 spread out as the blank canvas from which each successive slice of the final object will be created. In other cases, applicator 312 may directly apply or print the next layer onto a previous layer as defined by code 320, e.g., where the material is a polymer or where a metal binder jetting process is used. In the example shown, a laser or electron beam 316 fuses particles for each slice, as defined by code 320, but this may not be necessary where a quick setting liquid plastic/polymer is employed. Various parts of AM printer 306 may move to accommodate the addition of each new layer, e.g., a build platform 318 may lower and/or chamber 310 and/or applicator 312 may rise after each layer.

AM control system 304 is shown implemented on computer 330 as computer program code. To this extent, computer 330 is shown including a memory 332, a processor 334, an input/output (I/O) interface 336, and a bus 338. Further, computer 330 is shown in communication with an external I/O device/resource 340 and a storage system 342. In general, processor 334 executes computer program code, such as AM control system 304, that is stored in memory 332 and/or storage system 342 under instructions from code 320 representative of HGP component 100 (FIGS. 4-11D), described herein. While executing computer program code, processor 334 can read and/or write data to/from memory 332, storage system 342, I/O device 340 and/or AM printer 306. Bus 338 provides a communication link between each of the components in computer 330, and I/O device 340 can comprise any device that enables a user to interact with computer 330 (e.g., keyboard, pointing device, display, etc.). Computer 330 is only representative of various possible combinations of hardware and software. For example, processor 334 may comprise a single processing unit, or be distributed across one or more processing units in one or more locations, e.g., on a client and server. Similarly, memory 332 and/or storage system 342 may reside at one or more physical locations. Memory 332 and/or storage system 342 can comprise any combination of various types of non-transitory computer readable storage medium including magnetic media, optical media, random access memory (RAM), read only memory (ROM), etc. Computer 330 can comprise any type of computing device such as a network server, a desktop computer, a laptop, a handheld device, a mobile phone, a pager, a personal data assistant, etc.

Additive manufacturing processes begin with a non-transitory computer readable storage medium (e.g., memory 332, storage system 342, etc.) storing code 320 representative of HGP component 100 (FIGS. 4-11D). As noted, code 320 includes a set of computer-executable instructions defining object 302 that can be used to physically generate the object, upon execution of the code by system 300. For example, code 320 may include a precisely defined 3D model of HGP component 100 (FIGS. 4-11D) and can be generated from any of a large variety of well known computer aided design (CAD) software systems such as AutoCAD®, TurboCAD®, DesignCAD 3D Max, etc. In this regard, code 320 can take any now known or later developed file format. For example, code 320 may be in the Standard Tessellation Language (STL) which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional object to be fabricated on any AM printer. Code 320 may be translated between different formats, converted into a set of data signals and transmitted, received as a set of data signals and converted to code, stored, etc., as necessary. Code 320 may be an input to system 300 and may come from a part designer, an intellectual property (IP) provider, a design company, the operator or owner of system 300, or from other sources. In any event, AM control system 304 executes code 320, dividing HGP component 100 (FIGS. 4-11D) into a series of thin slices that it assembles using AM printer 306 in successive layers of liquid, powder, sheet or other material. In the DMLM example, each layer is melted to the exact geometry defined by code 320 and fused to the preceding layer.

Subsequent to additive manufacture, HGP component 100 (FIGS. 4-11D) may be exposed to any variety of finishing processes, e.g., minor machining, sealing, polishing, assembly to another part, etc.

In operation, as shown in FIG. 6, in response to the high temperature of HGP 56 reaching or exceeding a predetermined temperature of adaptive cover 220, adaptive cover 220 is removed to open cooling pathway 200. That is, the high temperature causes adaptive cover 220 to break away, ash, melt, etc., so as to remove the adaptive cover and allow cooling medium 190 to cool HGP component 100 where the spall occurs. As described herein, adaptive cover 220 may include any of a variety of heat transfer enhancing surfaces 230 such as: a dimpled surface 234 (FIG. 8), a bulged surface 232 (FIG. 7) and a striped surface 236 (FIG. 9). Alternatively, heat transfer enhancing surface 230 (228 FIG. 5) may be less smooth than outer surface 180. In addition thereto or alternatively, adaptive cover 220 may include weakened region 240 to promote removal thereof.

HGP component 100 according to embodiments of the disclosure provides a cooling pathway 200 that only opens in an area having a higher than anticipated temperature to cool that region and prevent damage to the underlying metal, which may significantly reduce nominal cooling flows. The use of the heat transfer enhancing surface 230 and/or weakened regions 240 creates a cooling pathway 200 that will quickly open upon the high temperature reaching or exceeding the predetermined temperature of adaptive cover 220.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A component for use in a hot gas path of an industrial machine, the component comprising:
   an outer surface exposed to a working fluid having a high temperature;
   an internal cooling circuit;
   a cooling pathway in communication with the internal cooling circuit and extending towards the outer surface;
   an adaptive cover in the cooling pathway at the outer surface, the adaptive cover configured to, in response to the high temperature reaching or exceeding a predetermined temperature of the adaptive cover, open the cooling pathway, wherein the adaptive cover includes a heat transfer enhancing surface at the outer surface causing the adaptive cover to absorb heat faster than the outer surface, wherein the adaptive cover includes a weakened region, on an inner portion of the adaptive cover, wherein the inner portion faces the cooling pathway, and wherein the weakened portion includes a groove along an edge of the weakened region, and wherein the edge of the weakened region is at a base of a wall of the cooling pathway, and
   wherein the component is additively manufactured such that the adaptive cover is integrally formed with the outer surface and the cooling pathway.

2. The component of claim 1, wherein the heat transfer enhancing surface includes at least one of: a dimpled surface, a bulged surface and a striped surface.

3. The component of claim 1, wherein the heat transfer enhancing surface is less smooth than the outer surface.

4. The component of claim 1, wherein the cooling pathway is at a non-orthogonal angle relative to the outer surface.

5. The component of claim 1, wherein the cooling pathway and the adaptive cover have a non-round cross-section at the outer surface.

6. A component for use in a hot gas path of an industrial machine, the component comprising:
   an outer surface exposed to a working fluid having a high temperature;
   an internal cooling circuit;
   a cooling pathway in communication with the internal cooling circuit and extending towards the outer surface; and
   an adaptive cover in the cooling pathway at the outer surface, the adaptive cover including a heat transfer enhancing surface at the outer surface causing the adaptive cover to absorb heat faster than the outer surface, wherein the adaptive cover includes a weakened region on an inner portion of the adaptive cover, wherein the inner portion faces the cooling pathway, wherein the weakened portion includes a groove along an edge of the weakened region, and wherein the edge of the weakened region is at a base of a wall of the cooling pathway.

7. The component of claim 6, wherein the heat transfer enhancing surface includes at least one of: a dimpled surface, a bulged surface and a striped surface.

8. The component of claim 6, wherein the heat transfer enhancing surface is less smooth than the outer surface.

9. The component of claim 6, wherein the cooling pathway is at a non-orthogonal angle relative to the outer surface.

10. The component of claim 6, wherein the cooling pathway and the adaptive cover have a non-round cross-section at the outer surface.

11. A non-transitory computer readable storage medium storing code representative of a hot gas path (HGP) component, the HGP component physically generated upon execution of the code by a computerized additive manufacturing system, the code comprising:
   code representing the HGP component, the HGP component including:
      an outer surface,
      an internal cooling circuit,
      a cooling pathway in communication with the internal cooling circuit and extending towards the outer surface, and
      an adaptive cover in the cooling pathway at the outer surface, the adaptive cover including a heat transfer enhancing surface at the outer surface causing the adaptive cover to absorb heat faster than the outer surface, wherein the adaptive cover includes a weakened region on an inner portion of the adaptive cover, wherein the inner portion faces the cooling pathway, wherein the weakened portion includes a groove along an edge of the weakened region, and wherein the edge of the weakened region is at a base of a wall of the cooling pathway.

12. The computer readable storage medium of claim 11, wherein the heat transfer enhancing surface includes at least one of: a dimpled surface, a bulged surface, a planar surface and a striped surface.

13. The computer readable storage medium of claim 11, wherein the heat transfer enhancing surface is less smooth than the outer surface.

14. The component of claim 1, wherein the weakened region is weakened by porosity.

15. The component of claim 6, wherein the weakened region is weakened by porosity.

16. The computer readable storage medium of claim 11, wherein the weakened region is weakened by porosity.

* * * * *